United States Patent

Kinney

[15] 3,640,395
[45] Feb. 8, 1972

[54] AUTOMATIC SELF-CLEANING STRAINER

[72] Inventor: Selwyne P. Kinney, Carnegie, Pa.

[73] Assignee: S. P. Kinney Engineers, Inc., Carnegie, Pa.

[22] Filed: Sept. 14, 1970

[21] Appl. No.: 71,680

[52] U.S. Cl. ............................210/334, 210/335, 210/411
[51] Int. Cl. .................................B01d 35/12, B01d 29/38
[58] Field of Search..................210/411, 333, 332, 334, 335, 210/339

[56] References Cited

UNITED STATES PATENTS 2,310,587   2/1943   MacNeill ............................210/411

*Primary Examiner*—Frank A. Spear, Jr.
*Attorney*—Parmelee, Utzler & Welsh

[57] ABSTRACT

An automatic self-cleaning strainer having multiple stages of straining within a single housing. Straining media are spaced in the housing along the liquid flow stream. The straining media are of progressively finer mesh and the free flow area of each stage of media is preferably greater than the flow area through the inlet of the housing. Each stage of straining media is provided with a backwash shoe engaging the upstream surfaces of the media. Each backwash shoe is coupled to a common manifold shaft which receives the backwash liquid and discharges it outside of the housing.

7 Claims, 5 Drawing Figures

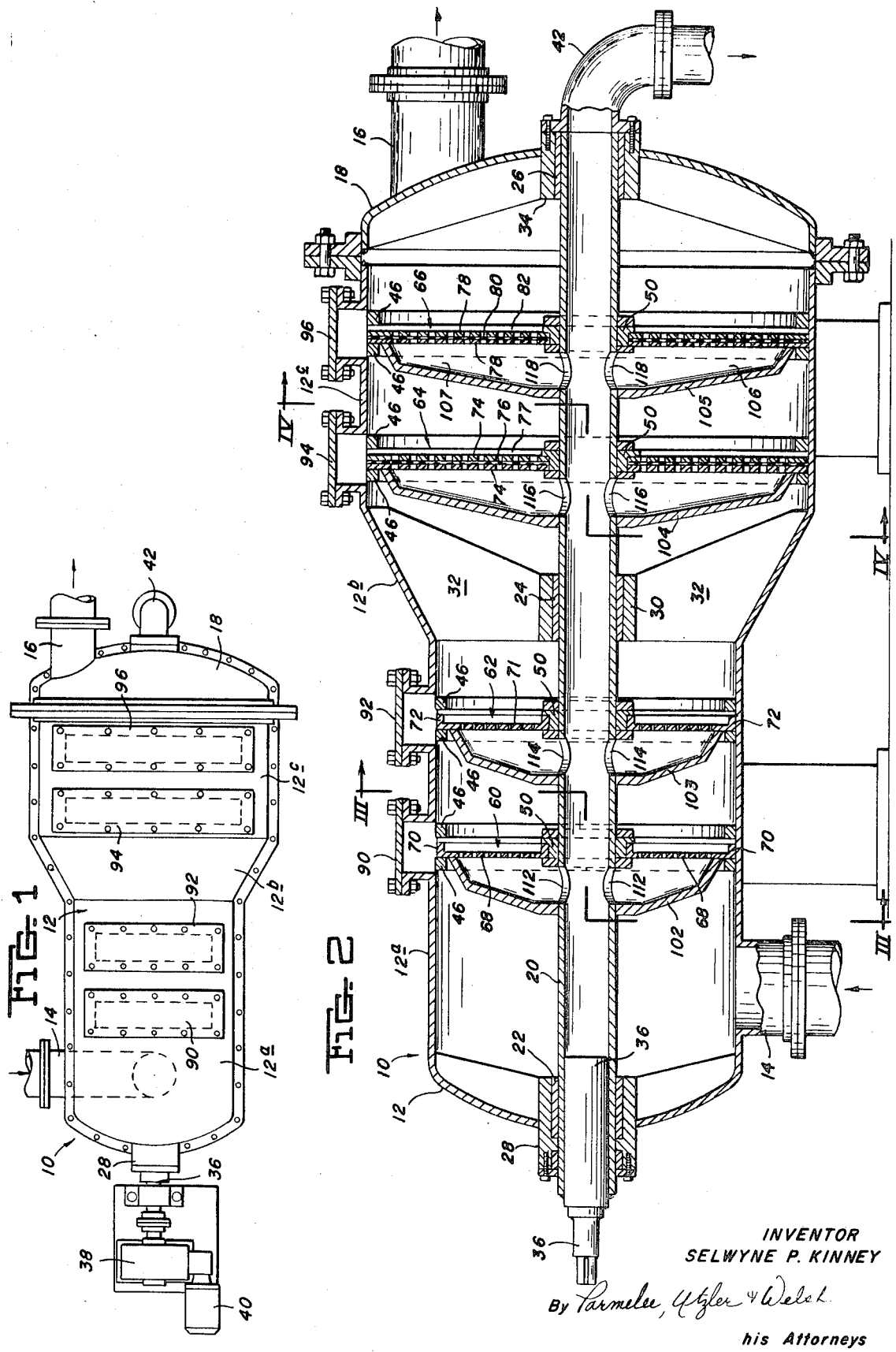

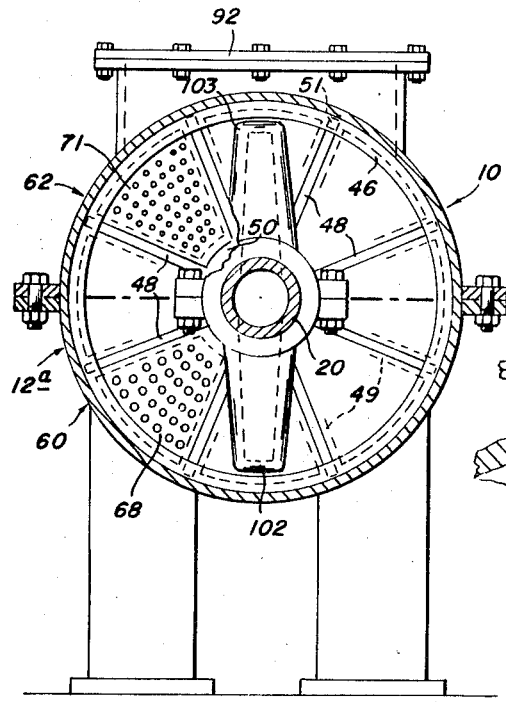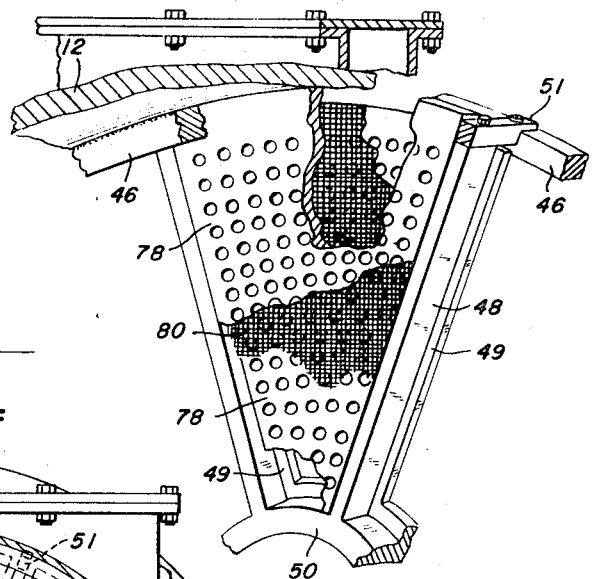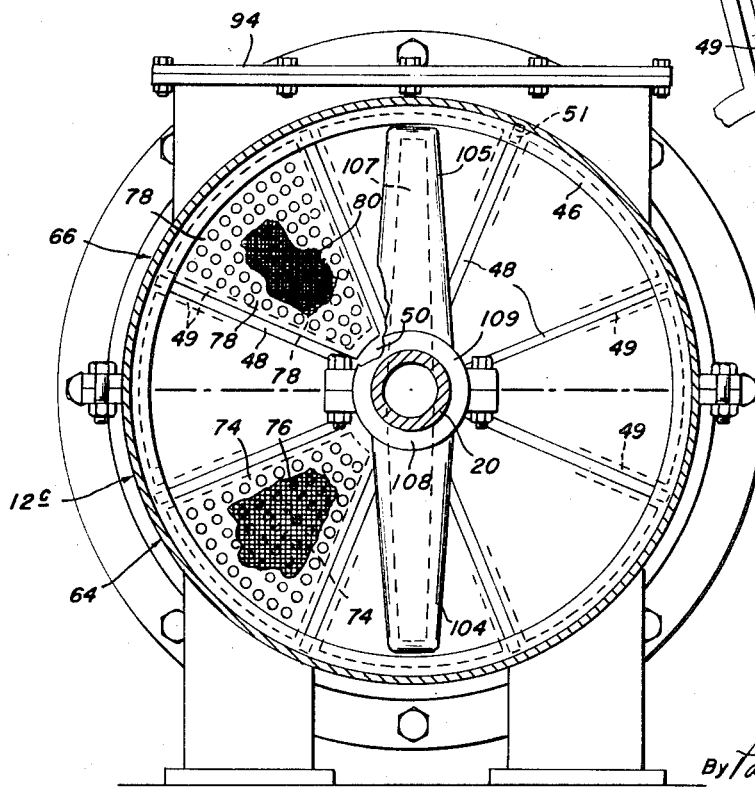

AUTOMATIC SELF-CLEANING STRAINER

This invention relates to an automatic self-cleaning strainer, and particularly to a multiple-stage automatic self-cleaning strainer having progressively finer screening media.

There are many industrial processes which use liquid that must be initially strained of solid matter. For example, there are processes which make use of surface water from streams, rivers, or lakes, and this water is often laden with solid matter which must be separated from the water. Strainers are used to remove solid above a certain size. Oftentimes the water is first strained and then filtered of the rest of the solid matter. When filtering, it is especially desirable to strain the water of as much solid matter as practical. Otherwise the filtering units will quickly clog. Even without a separate filtering step, it is often desirable to strain the water of all but microscopic-sized particles. The strainers commonly used are limited as to size of particle which may be strained. In revolving drum type strainers, for example, a certain area for liquid flow is established within the strainer, and if straining media below a certain mesh are used, the flow area will be cut down creating a resistance to flow. Also, the finer mesh straining media will clog rapidly, as compared to the coarse media, and cause restriction to flow. In addition, the revolving drum strainers are limited to particle size because of the impracticality of maintaining very small clearances between the revolving drum and the strainer body. The wide clearances give rise to short circuiting of inlet liquid into the outlet where the clearances are greater than the mesh size of the straining media. It might be added that the clogging problem in strainers attempting to use fine mesh straining media is not eliminated because of self-cleaning features. In the revolving drum strainers, for example, the drum revolves at a certain speed and the straining media are flushed as they pass a backwash shoe. The backwashing will not necessarily flush the media of all accumulated solid because the media might not be exposed to the backwash long enough. This would be especially so where fine mesh media are heavily laden with solids.

I overcome the above problems of fine straining by providing an automatic self-cleaning strainer which has multiple stages of straining within a single housing. The straining media is progressively finer and the free area through each stage is at least equal to, but preferably greater than, the inlet flow area of the strainer. Each stage of strainers is provided with a backwash shoe which receives backwash liquid flowing in reverse direction through the straining media. By providing multiple stages of finer straining, I avoid the clogging problem mentioned above. Also, the backwashing of the individual strainer stages is more efficient and thereby further reduces the possibility of clogging of the straining media. In addition, the flow through my strainer is not restricted since I make the free area through each stage of strainers at least equal to the inlet flow area. More particularly I provide an automatic self-cleaning strainer which preferably comprises: a hollow housing having a liquid inlet and outlet; a series of straining means disposed in the housing and spaced from each other along the liquid flow stream, each of the straining means having straining media being of progressively finer mesh and the total free flow area through each of the straining means being at least equal to the flow through the liquid inlet; backwash shoe means engaging the upstream surfaces of the media in each of the straining means for receiving backwash liquid flowing in reverse direction through the media to flush the media of solid matter and for discharging the backwash liquid out of the housing; and the backwash shoes and straining means being rotatable with respect to each other.

Other details and advantages of this invention will become apparent as the following description of a preferred embodiment thereof proceeds.

In the accompanying drawings I have shown a present preferred embodiment of this invention in which:

FIG. 1 is a plan view of an automatic self-cleaning strainer embodying the present invention;

FIG. 2 is a longitudinal sectional view in elevation through the automatic self-cleaning strainer of FIG. 1;

FIG. 3 is a view taken along the line III—III of FIG. 2 showing the progressive finer mesh between the straining media of the first two stages of this invention;

FIG. 4 is a view taken along the line IV—IV of FIG. 2; showing the progressive finer mesh between the straining media of the third and fourth stages of this invention;

FIG. 5 is a perspective view of the fourth stage of straining means showing the elements forming such means with parts cut away to show details of construction, and a perspective of part of the strainer housing surrounding the straining means.

Referring now to the drawings, there is shown an automatic self-cleaning strainer generally designated by the numeral 10, including an elongated, generally cylindrically shaped housing 12 supported on ground surface with its longitudinal axis lying in a horizontal plane. Housing 12 has three sections to it, an inlet section 12a, a transition section 12b, and an outlet section 12c of larger diameter than the inlet section. The inlet section 12a has a liquid inlet 14 which would be connected to a source of liquid, and outlet section 12c has a liquid outlet 16 through a bell end cap 18 removably attached to the main shell of the housing.

A hollow elongated shaft member 20 extends coaxially through the housing 12 and is support for rotation therein by sleeve bearings 22, 24, and 26. Bearing 22 is arranged in a bearing housing 28 supported in the endbell forming part of the inlet section 12a of housing 12. Bearing 24 is arranged in a bearing housing 30 disposed in transition section 12b and fixed in place by radial webs 32 extending from inner surface of the transition section to the bearing housing. Bearing 26 is arranged in a bearing housing 34 supported in endbell 18. The left end of shaft 20, as viewed in FIG. 1, extends outwardly beyond the housing and is plugged by a stub shaft 36 fixed to shaft 20. Stub shaft 36 is connected to a gear reduction unit 38 which in turn is connected to drive motor 40 for supplying the power necessary to drive shaft 20. The right end of shaft 20 extends to the end of a bearing housing 34. A backwash outlet fitting 42 is secured to the bearing housing 34 in abutment with the right end of shaft 20 to communicate with the interior of the shaft. Backwash liquid will flow through shaft 20 and out of fitting 42. This will be elaborated upon more fully hereinafter.

There is provided four stages of straining in my strainer 10, although more or less may be used as desired. The straining means of each stage is similarly constructed and structure of one stage will be described with the understanding that it pertains to all stages, except for overall diameter, and where there are material differences, these will be specifically described. As clearly shown in FIGS. 2 and 5, there is provided a pair of parallel, like rings 46 fixed to the inner wall as by welding, for example. Arranged between rings 46 are arcuately spaced ribs 48, eight shown, extending radially outwardly from a hub 50 surrounding and rotatable with respect to shaft 20. The ribs 48 and hubs 50 are provided with a rearward flange 49 (See FIG. 5) which serves as a stop for straining media segments, to be described, which fit in between the ribs. The rings 46 in inlet section 12a are of the same outer diameter which is slightly less than the inner diameter of the inlet section, while rings 46 in outlet section 12c have the same size relationship to the inner diameter of that section. The inner diameter of all the hubs 50 are the same, which diameter is slightly larger than the outer diameter of shaft 20. The entire assembly of the ribs 48 and hub 50 is selectively rotatable with respect to shaft 20 but in operation of the strainer 10 the assembly is fixed against rotation, as by key plates 51 bolted between the upper disposed ribs 48 and the upper section of the rings 46 (See FIG. 5). The assembly of the ribs 48 and hub 50 is made rotatable for the purpose of removing or replacing straining elements, as will be more fully described hereinafter.

Eight like compartments are formed between the rings 46 into which sections of straining media are inserted. The sections of straining media of each stage are represented by numerals 60, 62, 64, and 66, respectively. The first-stage sections 60 are each formed of perforated plate 68 with a continuous stiffening member 70 fixed to the entire rear margin of the section. Stiffening members are provided on the sections of straining media of all the stages for supporting the media to withstand the pressure drops encountered across the media. The second-stage section 62 is similarly constructed with a perforated plate 71 and a stiffening member 72. The perforations in the second-stage plate 71, however, are smaller than the perforations in the plates of the first-stage sections. Each section 64 of the third stage is formed of a composite of like perforated plates 74 separated by screening 76. The rear of downstream plate 74 has a continuous stiffening member 77 fixed to it. The perforations of plates 74 are aligned with each other, and are considerably larger than perforations of plates 68 and 71. However, the mesh of screening 76 is finer than the perforations of plate 71 of the second stage. Each section 66 of the fourth stage is constructed similarly to that of each section 64 of the third stage. Each section 66 has a pair of perforated plates 78 separated by screening 80 with the rear or downstream plate 78 having a stiffener member 82 fixed thereto. The size of the perforations of plates 78 could be the same size as the perforations of plates 76 of the third stage, but the mesh of the screening 80 is finer than that of screening 76. Thus, there is provided straining media of progressively finer mesh between the successive stages. I use the word "mesh" in describing the straining media of the successive stages, not to denote necessarily that each stage is formed of screening but to convey size of the straining media. Thus, when I say "progressively finer mesh" in reference to straining media, I mean that the openings through the media progressively diminish in size.

Access ports 90, 92, 94, and 96 are arranged above the respective stages of straining means. Each access port is provided with a removable cover. When it is desired to remove or install a section of straining media a cover plate over an access port is removed and the key plates 51 removed from the upper ribs 48 and the assembly of ribs 48 and hub 50 rotated relative to shaft 20 until the straining media section of concern is exposed to the access opening. The section would then be simply pulled out from between the ribs 48 and rings 46. The sections of straining media may, if desired, be clamped to the ribs 48 to prevent them from vibrating back and forth with the liquid flow stream passing through them. It is also noted that the front face of all the sections of all stages are substantially flush with the back edge of the forward upstream rings 46. This is clearly shown in FIG. 2. The front ring 46 will serve as a guide for the backwash shoes as will be described more fully hereinafter.

As stated previously the straining media of the successive stages has progressively finer mesh. By way of example, the perforations of the plates 68 of the first-stage section 60 could be 1/16 inch in diameter while the perforations of plates 71 of second-stage sections 62 could be 1/32 inch in diameter. The perforations of both plates 74 of the third-stage section 64 could be 1 inch in diameter with screening 76 being 40×40 mesh, while the plates 78 of the fourth-stage sections 66 could also be 1 inch in diameter with the screening 80 having an 80×80 mesh. The outer diameters of each stage is selected so that the free flow area through the straining media would preferably be greater than the flow area through inlet 14. In ascertaining the stage diameter the size of the straining media, backwash shoe area, and area of the stiffeners would be taken into consideration so that the proper free flow area through the straining media is selected. In my embodiment, I show the first and second stages to have the same outside diameter, while the third and fourth have the same outside diameter larger than that of the first and second stages. This diameter arrangement is made for manufacturing convenience, and so long as the second-stage diameter is large enough to provide a free flow area greater than the flow area of inlet 14, the free flow area of the first stage will be adequate. The same holds true with the fourth stage which if it is sized to provide adequate free flow area, the third-stage free flow area will be adequate.

There is provided a backwash shoe for each stage of straining means. Each backwash shoe 102, 103, 104 and 105 is similarly shaped with shoe 102 being identical to shoe 103, and shoes 104 and 105 being identical, but larger than shoes 102 and 103. Shoe 105 will be described with the understanding that the other shoes have the same basic features. Since shoe 105 is a propeller-type shoe having cup-shaped hollow arms 106 and 107 extending radially from half-hub sections 108 and 109, respectively. The hub sections 108 and 109 are secured to each other to surround shaft 20 so that the open faces of the arms 106 and 107 are flush with the straining media of the fourth-stage sections 66. In the case of the fourth stage, the open face of the arms 106 and 107 are flush with the front or upstream perforated plates 78. The arms 106 and 107 are also shaped so that they abut the inner rear margin section of upstream ring 46, to thus be guided by that ring. Openings 112, 114, 116, and 118 are provided through shaft 20 and the arms of each backwash shoe arranged on the shaft around the openings such that the interiors of the arms communicate with the interior of shaft 20 which as noted previously is open to the atmosphere. With the backwash shoes locked onto shaft 20, liquid in the housing 12, since it is above atmospheric pressure, will flow through the straining media in reverse direction to the liquid flow stream through housing 12 and into the arms of the backwash shoe and then through shaft 20 and out of the housing through backwash liquid outlet fitting 42. By rotating shaft 20 at a suitable speed, the entire surfaces of all of the straining media will be flushed clean of accumulated solid matter with the backwash liquid passing through all of the backwash shoes being combined in a common manifold for discharge from the housing.

Many modifications are contemplated within the scope of the essence of my present invention. For example, the straining means could be arranged to rotate while the backwash shoes are held fixed; drums containing straining media could be arranged in successive stages within a single housing; and the disc-type straining media could be replaced by other type media. It should be apparent that even other modifications and embodiments are possible within the scope of this invention as set forth in the following claims.

I claim:

1. An automatic self-cleaning strainer, comprising:
   a hollow housing having liquid inlet and outlet means;
   a series of straining means disposed in said housing and spaced from each other along the liquid flow stream, each of said straining means having straining media extending across the flow stream, with the media of each successive straining means being of progressively finer mesh and the total free flow area through each of said straining means being at least equal to the flow area through said inlet means;
   backwash shoe means engaging the upstream surfaces of said media in each of said straining means for receiving backwash liquid flowing in the reverse direction through the media to flush the media of solid matter and for discharging the backwash liquid out of said housing; and
   said backwash shoe means and said straining means being rotatable with respect to each other.

2. The automatic self-cleaning strainer as set forth in claim 1 wherein the free flow area through each of said straining means is greater than the flow area through said inlet means.

3. The automatic self-cleaning strainer as set forth in claim 1 wherein each of said straining means is fixed with respect to said housing, and said backwash shoe means is rotatable over the surface of said media.

4. The automatic self-cleaning strainer as set forth in claim 1 wherein said backwash shoe means includes a common manifold for receiving backwash liquid flowing through the media of each said straining means.

5. An automatic self-cleaning strainer, comprising:
   an elongated closed ended hollow housing having a liquid inlet and outlet disposed at opposite end portions thereof;

a hollow shaft supported in said housing for rotation about the longitudinal axis thereof, said shaft being closed at the end thereof in the inlet portion of the housing and open at the other end to the outside of said housing;

a series longitudinally spaced disc-shaped straining members extending transversely to engage inner surface portions of said housing, each of said straining members having straining media across the liquid flow stream with the media of each successive straining means being of progressively finer mesh and the total free flow area through each of said straining means being at least equal to the flow area through said inlet;

backwash shoe members disposed in said housing and communicating with the interior of said shaft and engaging said straining media of each of said straining members;

at least one of said members being supported by said shaft for rotation therewith; and discharge means coupled to the open end of said shaft for discharging backwash liquid externally of said housing.

6. The automatic self-cleaning strainer as set forth in claim 5 wherein said straining members are fixed with respect to said housing, and said backwash shoe members are supported by said shaft for rotation therewith.

7. The automatic self-cleaning strainer as set forth in claim 5 wherein the free flow area through each of said straining means being greater than the flow area through said inlet.

* * * * *